July 29, 1924.
A. J. LAVOIE
1,502,728
STEERING MECHANISM
Original Filed Jan. 21, 1922　　3 Sheets-Sheet 1
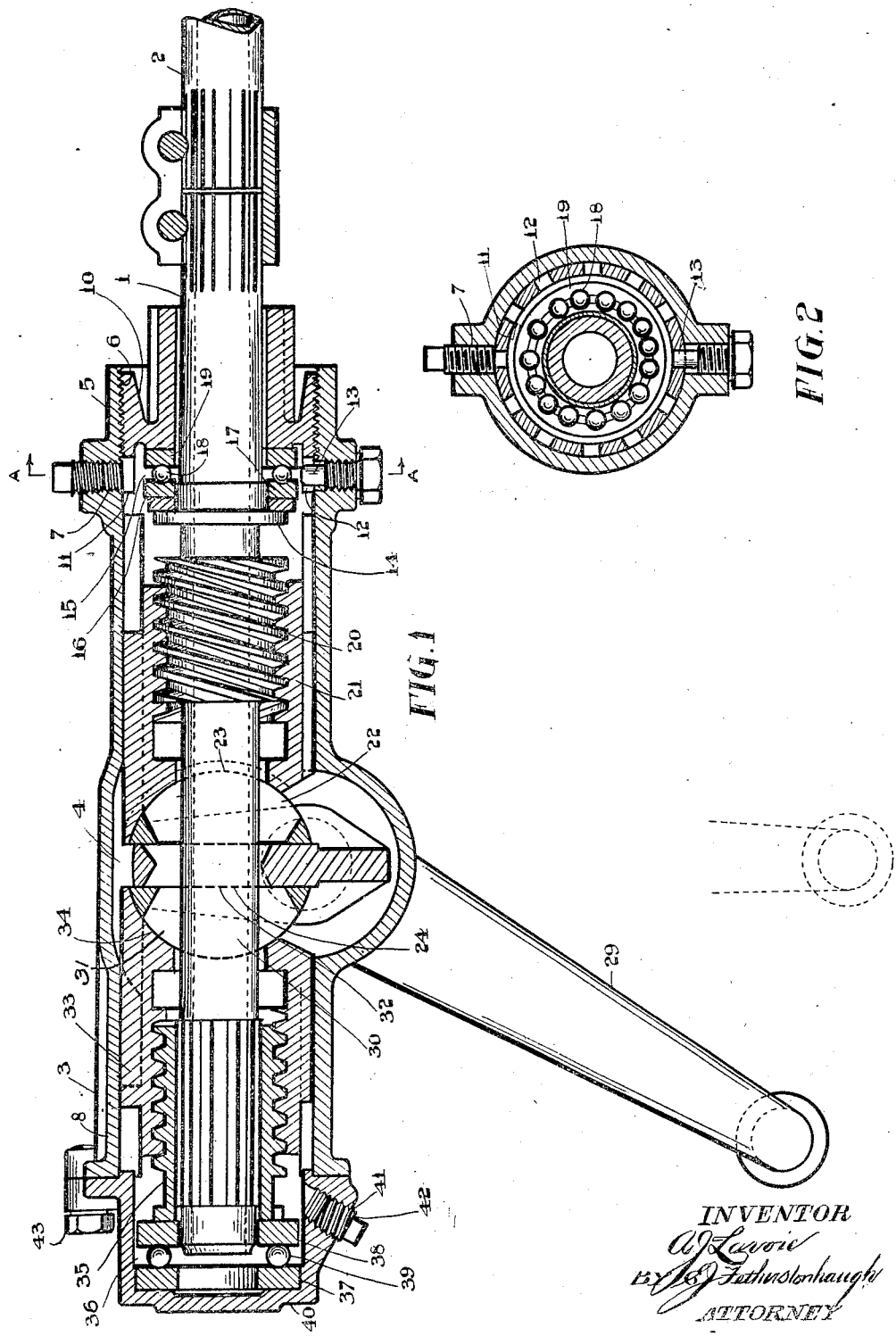

July 29, 1924.

A. J. LAVOIE

STEERING MECHANISM

Original Filed Jan. 21, 1922  3 Sheets-Sheet 2

INVENTOR
A. J. Lavoie
BY Fetherstonhaugh
ATTORNEY

Patented July 29, 1924.

1,502,728

UNITED STATES PATENT OFFICE.

ALPHONSE JOSEPH LAVOIE, OF MONTREAL, QUEBEC, CANADA.

STEERING MECHANISM.

Application filed January 21, 1922, Serial No. 530,873. Renewed June 3, 1924.

*To all whom it may concern:*

Be it known that I, ALPHONSE JOSEPH LAVOIE, a subject of the King of Great Britain, and residing at the city of Montreal, in the Province of Quebec, in the Dominion of Canada, have invented a new and useful Steering Mechanism, of which the following is the specification.

The invention relates to steering mechanism as described in the present specification and illustrated in the accompanying drawings that form part of the same.

The invention consists essentially of the novel features of construction pointed out broadly and specifically in the claims for novelty following a description in detail of the preferred form of the invention.

The objects of the invention are to reduce the cost of manufacturing steering gear particularly of the type described and illustrated in an application for a patent filed under Serial No. 517,914 on the 26th day of November, 1921; to facilitate the adjustment of the parts to take up wear; to eliminate the danger incident to single tooth grips; and generally to produce economically a high grade mechanism for the aforesaid purposes.

In the drawings, Figure 1 is a longitudinal sectional view of the device.

Figure 2 is a cross sectional view on the line A—A in Figure 1.

Like numerals of reference indicate corresponding parts in the various figures.

Figures 3, 4:
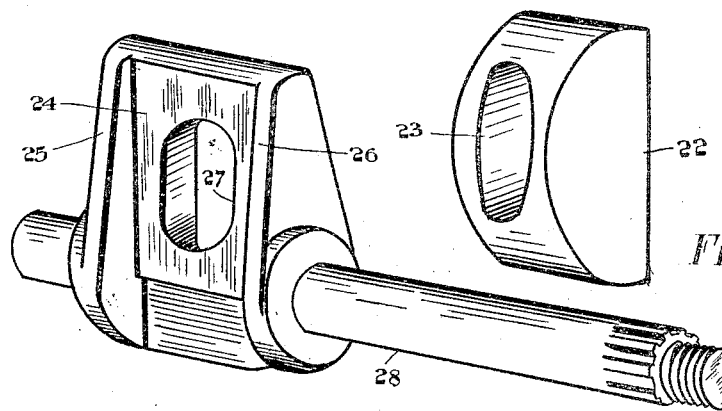
Figure 3 is a perspective detail of lever plate and lever shaft.
Figure 4 is a perspective detail of a lever operating block.
Figure 5:
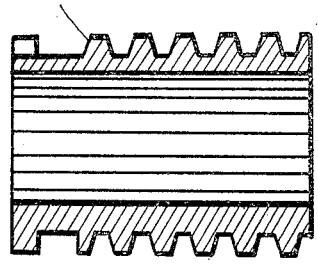
Figure 5 is a longitudinal sectional view of the lower screw.
Figure 6:
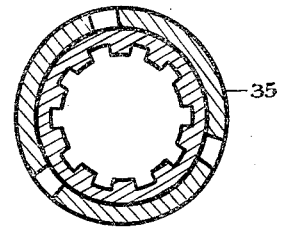
Figure 6 is a cross sectional view of the lower screw.
Figure 7:
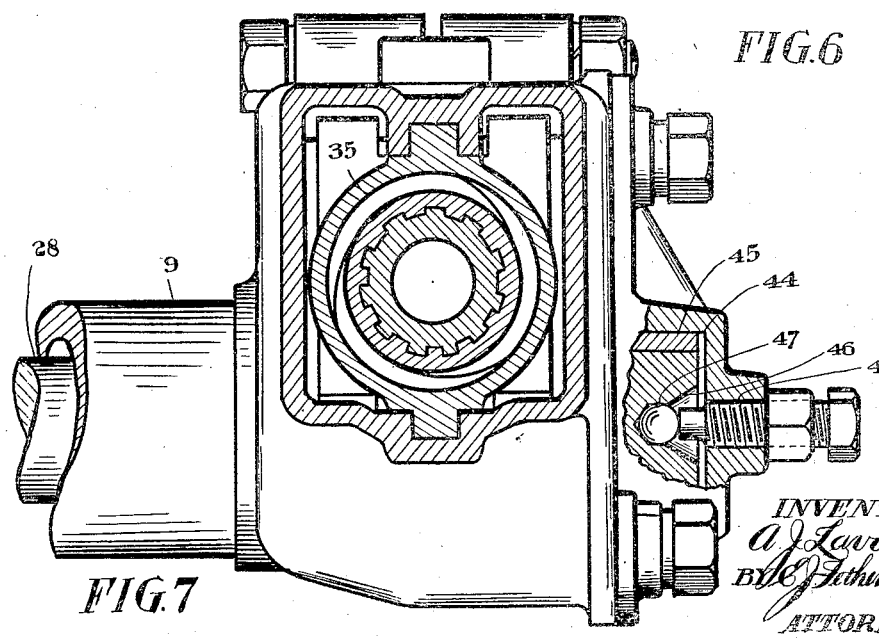
Figure 7 is a cross sectional view of the housing through the lower nut.
Figure 8:
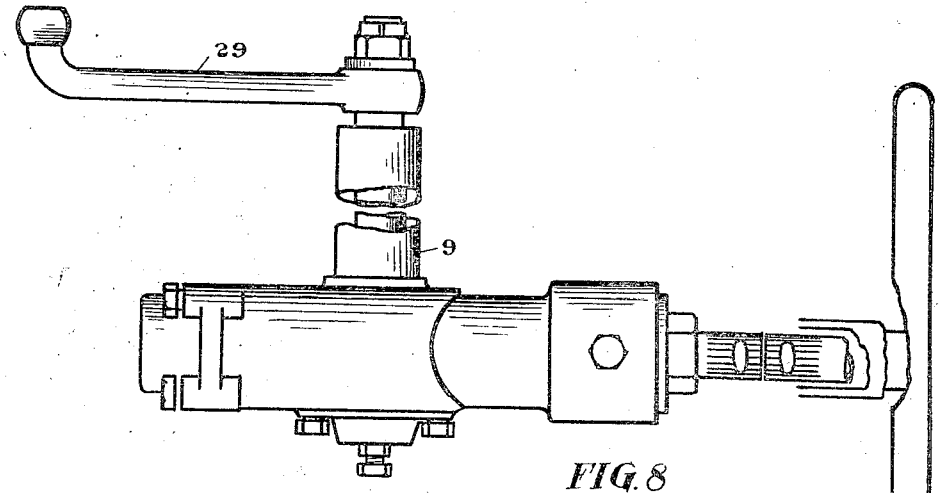
Figure 8 is an elevation of the housing lever arm and operating wheel and connecting parts broken away.
Figure 9:
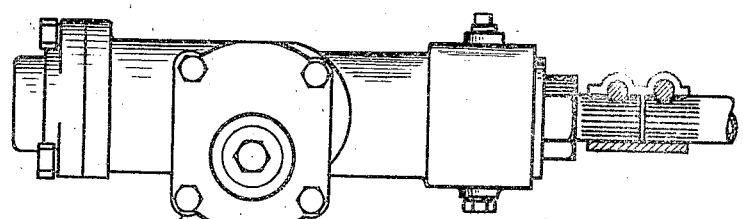
Figure 9 is a plan view of housing and lever arm.
Figure 10:
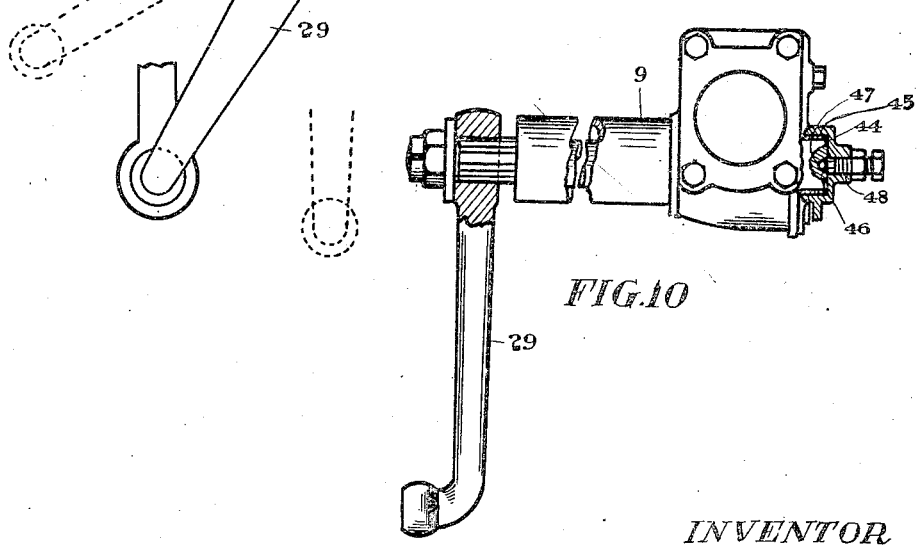
Figure 10 is an end elevation showing the end thrust bearing.

Referring to the drawings, 1 indicates the operating shaft suitably clamped to the steering post 2.

The housing 3 contains the bearings for the shaft 1 and is formed intermediate of its length with a lever chamber 4 and at its upper end with an annular exterior boss 5 having an internal thread 6 and having screw holes therethrough.

The lower end 8 of the housing 3 is flanged while the wall of the lever chamber is formed with a shaft bearing 9.

The nut 10 is screwed into the internal thread 6 and closes the upper end of the housing 3 and forms an adjusting member for taking up the wear in the parts and is therefore formed with an annular slotted extension 11 projecting across the screw holes 7 and having the slots 12 for receiving the screws 13 in holding the shaft and parts to their adjusted position.

The shaft 1 is formed with a shoulder 14 on which the thrust bearing 15 is mounted, the washer or bushing 16 being introduced between the ball race ring 17 and shoulder 14 the balls 18 and ring 19 completing the bearing, the latter ring 19 abutting the nut 10 for adjusting purposes.

The shaft inside the shoulder 14 carries the screw 20 which is either integral with the shaft or fixedly mounted thereon and turns within the slidable nut 21 which it moves upwardly and downwardly in the housing as the nut is splined in said housing.

The nut 21 is recessed at its bottom end to form a socket for the lever operating block 22 in part ball shape and slotted at 23 for the freedom of movement on the shaft 1.

The lever operating block 22 lies flat on the lever plate 24 between the flanges 25 and 26 and over the shaft hole 27 in said plate, the latter being pivoted towards the outer end by means of the shaft 28 journaled in the wall bearings, said shaft 28 carrying the crank arm 29 for steering purposes.

The lower operating block 30 is similarly formed to the block 22 having the part ball shape, the shaft slot 31 and the flat surface 32 engaging the lower face of the lever plate 24.

The lower nut 33 is dished at its upper end 34 to form a socket for the block 30 and is splined to the housing 3 for coincident movement with the upper nut.

The lower screw 35 is splined to the shaft 1 for adjusting purposes and abuts the thrust bearing 36 formed of the ball race rings 37 and 38 and balls 39 contained in the crown of the cap 40 into which the screw 35 and shaft 1 extend, said cap having a drain and oil hole 41 and screw plug 42 closing said hole. The cap 40 is secured to the lower flange end of the housing 3 by the bolts 43.

In the operation of this mechanism, the turning of the shaft 1 drives the upper and lower screws and consequently operates the upper end lower nuts, which are in intimate relation through the lever operating blocks with the lever plate and it is obvious that the part ball arrangement of the blocks will permit freedom of movement.

The turning of the lever plate rotates its pivot which is the shaft carrying the crank arm that is connected to a reach rod and other connecting members to the wheels of the vehicle.

The salient features in this invention are the elimination of parts usually found necessary, the complete container for the mechanism closed by a screw stopper herein termed an adjusting nut and the take up for the wear from the stopped end which can be done by removing the boss screws and turning adjusting nut and reinserting the screws, thereby providing the simplest form of take up mechanism.

The pivot shaft 28 extends at its inner end into the recess 44 in the wall of the housing, said recess having the bushing 45 therein forming part of the shaft bearing. This shaft 28 is recessed at the extreme inner end to form a cup 46 for the ball 47 which is engaged by the adjusting screw 48 to take up all wear and maintain the shaft 28 in good operating position.

What I claim is:

1. In steering mechanism, a housing permanently capped at one end and forming a case adapted to receive the operating parts from the open end, shaft bearings in said cap, a shaft journalled in said shaft bearings and having a shoulder towards the outer end of said case, shaft bearings having one member supported on said shoulder, a fixed screw and a sliding screw on said shaft, upper and lower nuts driven by said screws, a crank lever suitably operated by and between the ends of said nuts and an adjusting nut screwed into said case at the outer end and engaging the other member of the outer bearings and suitably locked.

2. In a steering mechanism, a housing permanently capped at the lower end and having a drain opening in the cap closed by a plug and at the upper end an internal thread and a reinforced wall at the lower part of said thread, a locking pin screwed into and through said reinforced wall, a shaft and bearings therefor in said case and fixed and sliding screws on said shaft, nuts driven by said screws, crank members including a crank lever having a shaft hole and oscillatory shoes between said nuts and lever, and a nut screwed into said casing and stopping the open end and forming an adjustment member in taking up the wear.

3. In a steering mechanism, a housing permanently capped at one end and forming a case adapted to permit the introduction of the operating parts from the open end, a shaft having a shoulder near the upper end and bearings within said case, one bearing being mounted on said shoulder and the other bearing being at the lower end in the cap, upper and lower screws on said shaft, nuts driven by said screws, crank members including a crank lever having a shaft hole and oscillatory shoes mounted above and below on lever and engaged by said nuts, and a nut screwed into said casing and stopping the open end and forming an adjustment member in taking up the wear.

4. In a steering mechanism, a housing permanently capped at one end and forming a case adapted to permit the introduction of the operating parts from the open end, a shaft journalled in said case, bearings supported by the cap at the inner end and by the shaft towards the outer end upper and lower screws on said shaft, nuts mounted on said screws, crank members including a crank lever having a shaft hole and oscillatory shoes on said lever and engaged by the nuts, a nut screwed into said casing at the upper open end and engaging a bearing and having an extension therefrom, and a locking pin screwed into and through the housing wall and engaging said extension.

5. In a steering mechanism, a housing permanently capped at one end and forming a case adapted to permit the introduction of the operating parts from the open end, a shaft and bearings therefor in said case and fixed and sliding screws on said shaft, nuts mounted on said screws, crank members including a crank lever having a shaft hole and oscillatory shoes on said crank lever and engaged by said nuts, a nut screwed into said casing at the open end and exerting pressure on a shaft bearing and shaft and having a slotted extension below the threaded portion, and a locking pin engaging said nut in one of said slots.

6. In a steering mechanism, a housing permanently capped at one end and forming a case adapted to permit the introduction of the operating parts from the open end, a shaft and bearings therefor in said case and fixed and sliding screws on said shaft, nuts mounted on said screws, crank members including a crank lever having a shaft hole and oscillatory shoes on said crank lever and engaged by said nuts, a nut closing the open end of said casing and having an upward wrench extension closely encircling the shaft and a lower circular extension distanced from the shaft and slotted radially, and a locking pin screwed into and through the housing wall and entering one of said slots.

Signed at Montreal, Canada this 9th day of January, 1922.

ALPHONSE JOSEPH LAVOIE.